July 31, 1923.

F. KRATZ 1,463,396

ELASTIC OLDHAM COUPLING

Filed July 31, 1922

Inventor.
Franz Kratz
by Stewart & McKay
his Attorneys.

Patented July 31, 1923.

1,463,396

UNITED STATES PATENT OFFICE.

FRANZ KRATZ, OF STUTTGART, GERMANY, ASSIGNOR TO ROBERT BOSCH AKTIENGE-SELLSCHAFT, OF STUTTGART, GERMANY.

ELASTIC OLDHAM COUPLING.

Application filed July 31, 1922. Serial No. 578,675.

*To all whom it may concern:*

Be it known that I, FRANZ KRATZ, a citizen of Germany, residing at Stuttgart, Germany, have invented certain new and useful Improvements in Elastic Oldham Couplings, of which the following is a specification.

This invention relates to an Oldham coupling which is elastic in its circumferential direction and is distinguished from similar couplings by being composed of but a few parts which are, in most cases, of equal construction whereby the manufacture of the coupling and the assembling of its parts is greatly simplified.

According to this invention, the intermediate member or coupling member, as peculiar to the Oldham coupling, is radially cut open between a lug of the driving coupling half and a lug of the driven coupling half; elastic insertions are placed into the gaps thus formed, and the various parts of the intermediate member are held together by means of a suitable fitting as is all more fully described hereinafter.

Figure 1:
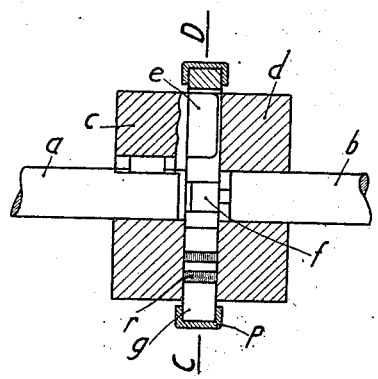
Figure 2:
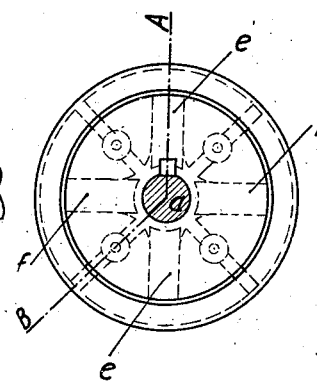
Figure 3:
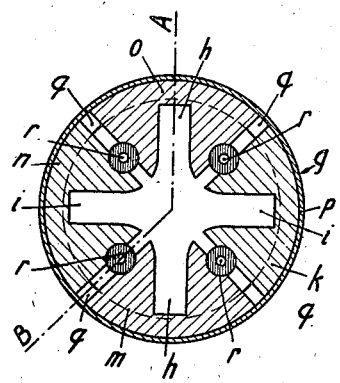

My invention is illustrated, by way of example, in the accompanying drawing, in which Fig. 1 is an axial section through the coupling parts in line A—B of Figures 2 and 3. Fig. 2 is a frontal view of the coupling. Fig. 3 is a transverse section through the intermediate member of the coupling in line C—D of Figure 1.

Referring to Figure 1, $a$ and $b$ are the ends of the shafts to be coupled by the coupling halves, of which $c$ is affixed to the shaft $a$, and $d$ to the shaft $b$. The coupling half $c$ has lugs $e$, and the coupling half $d$ has lugs $f$. These lugs engage corresponding recesses of an intermediate member $g$ which, preferably, consists of vulcanized fibre. The lugs $e$ of the coupling half $c$ engage the recesses $h$, and the lugs $f$ of the coupling half $d$ engage the recesses $i$ of the intermediate member $g$.

This member which in the ordinary rigid Oldham coupling is a simple disk with a cross-shaped double-slot is composed of four separate parts $k$, $m$, $n$, $o$, formed by radial cuts $q$. The width of these cuts, or slots respectively, is such that the parts $k$, $m$, $n$, $o$, have as much play relatively to each other as is required for the yieldableness of the coupling.

Holding these parts together is effected by a closed ring $p$ of U-shaped transverse section, in which they are loosely inserted.

The parallel surfaces of each cut or gap or slot $q$ have oppositely located cavities of circular curve, and each pair of these cavities holds a hollow india-rubber roll $r$, these rolls permitting of the relative displaceability of the parts $k$, $m$, $n$, $o$, in the circumferential direction of the coupling; in other words, said rolls warrant the elastic transmission of the power from the shaft $a$ to the shaft $b$.

Instead of the india-rubber rolls other buffers may be employed, for instance prismatic bodies of india-rubber or the like, or coiled springs, or leaf springs, or the like.

Having now described my invention, what I desire to secure by a patent of the United States is:

1. An elastic Oldham coupling, comprising, in combination a driving coupling half, and transmitting lugs projecting from this half towards the driven coupling half; a driven coupling half, and transmitting lugs projecting from this half towards the driving coupling half; an intermediate transmitting member composed of a plurality of parts having gaps between them and containing each a portion of the cross-shaped double-slot of the coupling; elastic insertions in said gaps; and means for holding together the parts of the intermediate transmitting member, as set forth.

2. An elastic Oldham coupling, comprising, in combination a driving coupling half, and transmitting lugs projecting from this half towards the driven coupling half; a driven coupling half, and transmitting lugs projecting from this half towards the driving coupling half; and intermediate transmitting member subdivided into a plurality of equal parts having gaps between them and containing each a portion of the cross-shaped double-slot of the coupling; elastic insertions in said gaps; and means for holding together the parts of the intermediate transmitting member and being adapted to allow of a relative movement of these parts, as set forth.

3. An elastic Oldham coupling, comprising, in combination a driving coupling half, and transmitting lugs projecting from this half towards the driven coupling half; a driven coupling half, and transmitting lugs projecting from this half towards the driving coupling half, an intermediate transmitting member composed of a plurality of parts having gaps between them and containing each a portion of the cross-shaped double-slot of the coupling; india-rubber bodies inserted into said gaps; and means for holding together the parts of the intermediate transmitting member, as set forth.

4. An elastic Oldham coupling, comprising, in combination a driving coupling half, and transmitting lugs projecting from this half towards the driven coupling half; a driven coupling half, and transmitting lugs projecting from this half towards the driving coupling half, an intermediate transmitting member composed of a plurality of parts having gaps between them and containing each a portion of the cross-shaped double-slot of the coupling; elastic insertions in said gaps; and a ring having U-shaped transverse section and encompassing the rim portions of the parts of the intermediate transmitting member, as set forth.

In testimony whereof I have affixed my signature in presence of two witnesses.

FRANZ KRATZ. [L. S.]

Witnesses:
   FRANK H. REDIKER,
   WALTER BRAUN.